United States Patent Office.

LEWSON E. CHASE, OF WATERTOWN, ASSIGNOR TO CHASE & CO., OF BOSTON, MASSACHUSETTS.

Letters Patent No. 100,375, dated March 1, 1870.

IMPROVEMENT IN CONFECTIONERY.

The Schedule referred to in these Letters Patent and making part of the same

*To all persons to whom these presents may come:*

Be it known that I, LEWSON E. CHASE, of Watertown, in the county of Middlesex, and State of Massachusetts, have made a new and useful Improvement in Confectionery; and I do hereby declare the same to be fully described in the following specification.

My invention has reference solely to what is known to manufacturers of confectionery under the name of "boiled confectionery," such as the different varieties of candy, &c., for instance, in which the sugar or saccharine matter constituting the principal ingredient is brought to the requisite condition or state for manipulation by the act of boiling.

It is a fact well known to those conversant with the manufacture of confectionery that most if not all kinds of candy now sold in the market are more or less injuriously affected by the action of the atmosphere, that is, they soon deteriorate and not only lose the delicate flavor, richness, and freshness of taste they have when first manufactured, but undergo a sort of decomposition, either some chemical action taking place or the moisture of the atmosphere combining with the native gluten of the sugar so weakens its adhesive power as to leave little or no cohesion in the mass of sugar, and thereby causes it to "grain" or resolve itself into its elementary particles.

To remedy these defects, as well as to give to such confectionery a more plastic and desirable "chewing quality," is the object of my invention.

In experimenting, I have discovered that by combining with the sugar and other ingredients ordinarily used in the manufacture of candy and other boiled confectionery, a quantity of glucose or grape sugar, I am not only able to preserve for a long period of time the rich, delicate flavor and freshness of taste incident to such confectionery when newly made, but to impart to it a desirable plastic "chewing quality" not possessed by boiled confectionery as heretofore made.

In carrying out my invention in making twenty pounds of candy, for instance, I take ten pounds of good granulated or refined sugar and an equal amount of glucose or grape sugar, and add thereto the ordinary flavoring extracts and a sufficient amount of water to dissolve the sugar and glucose or grape sugar. The whole is next to be boiled and afterward manipulated in the usual manner.

I do not confine myself to the above proportions, as more or less of the glucose or grape sugar may be employed to give a greater or less consistency or "chewing quality" to the confection, as may be desirable.

I claim—

1. In the manufacture of boiled confectionery, the use or employment of the substance herein mentioned, in combination with the other ingredients usually employed, as and for the purpose set forth.

2. A confection so made as an improved article of manufacture.

LEWSON E. CHASE.

Witnesses:
 JNO. T. CALL,
 F. P. HALE.